United States Patent [19]

Harvey

[11] Patent Number: 4,860,041

[45] Date of Patent: Aug. 22, 1989

[54] CAMERA APPARATUS FOR ADVANCING A FILM LEADER FROM A FILM CASSETTE

[75] Inventor: Donald M. Harvey, Webster, N.Y.

[73] Assignee: Eastman Kodak Company, Rochester, N.Y.

[21] Appl. No.: 215,841

[22] Filed: Jul. 6, 1988

[51] Int. Cl.⁴ .............................................. G03B 1/00
[52] U.S. Cl. .................................................. 354/212
[58] Field of Search ............................... 354/212–216, 354/288

[56] References Cited

U.S. PATENT DOCUMENTS

| | | | |
|---|---|---|---|
| 3,481,260 | 12/1969 | Attischer et al. | 354/212 |
| 4,314,751 | 2/1982 | Harvey | 354/212 |
| 4,332,453 | 6/1982 | Seely et al. | 354/212 X |
| 4,423,943 | 1/1984 | Gold | 354/275 X |
| 4,516,843 | 5/1985 | Ohmura | 354/212 X |
| 4,564,279 | 1/1986 | Sitzler et al. | 354/214 |
| 4,751,538 | 6/1988 | Konno | 354/212 |

Primary Examiner—L. T. Hix
Assistant Examiner—Brian W. Brown
Attorney, Agent, or Firm—Roger A. Fields

[57] ABSTRACT

In a photographic camera, closing movement of a cover door operates to rotate a film spool in an unwinding direction within a film cassette, loaded in the camera, to automatically propel a film leader from inside the cassette shell to outside the shell.

9 Claims, 9 Drawing Sheets

CAMERA APPARATUS FOR ADVANCING A FILM LEADER FROM A FILM CASSETTE

CROSS-REFERENCE TO A RELATED APPLICATION

Reference is made to commonly assigned copending application Serial No. 193,323, entitled FILM CASSETTE, and filed May 12, 1988 in the name of Jeffrey C. Robertson.

BACKGROUND OF THE INVENTION

1. Field of the Invention

The invention relates generally to photography, and particularly to apparatus for advancing a film leader from a film cassette in a camera.

2. Description of the Prior Art

Generally speaking, commercially available 35 mm film cassettes comprise a hollow cylindrical shell having an integral throat or lipped portion which extends tangentially from the shell. A film spool on which the filmstrip is wound is freely rotatable within the cylindrical shell. The filmstrip has a leading end section, commonly referred to as a "film leader", which extends through a light-trapped slit in the throat portion to the outside of the shell. Typically, the film leader is 2–3 inches in length and is normally curled about the shell.

When loading a conventional camera with such a film cassette, a rear door of the camera is widely opened. Then, the cassette with the film leader held uncurled from around the cylindrical shell is inserted into a rear loading chamber in the camera. The manually straightened leader is positioned with its leading tip adjacent a take-up drum in the camera and with one or more of its perforations in engagement with a corresponding number of teeth of a metering sprocket located between the take-up drum and the loading chamber. This film loading operation is rather troublesome and requires a certain amount of skill and manual dexterity. Accordingly, it is rather difficult for certain people.

More recently, several bottom loading cameras have been proposed which include simple means for automatically uncurling the film leader from around the cylindrical shell as the film cassette is inserted endwise, i.e. axially, through a bottom opening to the loading chamber in the camera. For example, in commonly assigned U.S. Pat. No. 4,332,453, granted June 1, 1982, the automatic uncurling means comprises a quarter-round corner located adjacent the loading chamber in the camera and an inclined straight edge extending generally along the bottom of the camera. When a bottom door of the camera is widely opened and the cassette is initially inserted into the loading chamber, a full width (uncut) section of the film leader adjacent the throat portion of the cassette is pushed against the quarter-round corner. The quarter-round corner, in turn, deflects the full width section of the leader to position a reduced width (cut) section of the leader forward of the full width section crosswise against the inclined straight edge. Then, with continued insertion of the cassette into the loading chamber, the reduced width section of the leader is progressively straightened by its movement against the inclined straight edge. Thus, the film leader is progressive uncurled as the cassette is inserted axially into the loading chamber.

Although known recent cameras which include automatic uncurling means for the film leader appear to work satisfactorily, the structure in the camera comprising such means may tend to increase manufacturing costs to a significant extent. Moreover, as in the case of other cameras, it is possible for the film leader to become snagged during the film loading operation.

A 35 mm film cassette has been proposed which, unlike conventional film cassettes, includes a film leader that does not extend outside the cassette shell. The leader, instead, is located entirely within the cassette shell. Specifically, in U.S. Pat. No. 4,423,943, granted Jan. 3, 1984, there is disclosed a film cassette wherein the outermost convolution of the film roll wound on the film spool is radially constrained by respective circumferential lips of two axially spaced flanges of the spool to prevent the outermost convolution from contacting an inner wall of the cassette shell. The trailing end of the filmstrip is secured to the film spool, and the leading end of the filmstrip is reduced in width to allow it to protrude from between the circumferential lips and rest against the shell wall. During unwinding rotation of the film spool, the leading end of the filmstrip is advanced to and through a film passageway opening in order to exit the cassette shell. The opening has a width which is slightly less than the width of the filmstrip, thus resulting in the filmstrip being transversely bowed as it is uncoiled from the film spool, and thereby facilitating movement of the film edges under the circumferential lips of the respective flanges.

While the film cassette disclosed in U.S. Pat. No. 4,423,943 includes a non-protruding film leader which is automatically advanced to the outside of the cassette shell when the film spool is rotated in the unwinding direction, the film cassette appears to be intended to be loaded in a camera only after the film leader is advanced to protrude from the cassette shell. In the patent, it is suggested that one manually rotate the film spool relative to the cassette shell until the leader can be manually grasped and attached to a film advancing device in a camera. Thus, the loading problems regarding manipulation and snagging of the leader similarly apply to this prior art example.

THE CROSS-REFERENCED APPLICATION

Like the type of film cassette disclosed in U.S. Pat. No. 4,423,943, the cross-referenced application discloses a film cassette that contains a non-protruding film leader which is automatically advanced to the outside of the cassette shell in response to rotation of the film spool in the unwinding direction.

SUMMARY OF THE INVENTION

According to the invention, there has been devised a photographic camera which substantially facilitates the film loading operation. Specifically, the invention is an improved camera wherein a cover door is supported for opening and closing movements to uncover and recover a film cassette-receiving chamber, and wherein the improvement comprises:

said chamber being configured to receive a film cassette having a film spool engageable for rotation in an unwinding direction to propel a film leader from inside the cassette to outside the cassette;

a drive member rotatable in engagement with the film spool in a predetermined direction to rotate the film spool in the unwinding direction; and motion responsive means responsive to closing movement of the cover door for rotating the drive member in the predetermined direction, whereby the film leader will automatically be propelled from the film cassette.

More specifically, the motion responsive means includes releasable coupling means for connecting the cover door and the drive member substantially during closing movement of the cover door, to rotate the drive member in the predetermined direction, and for disconnecting the cover door and the drive member whenever the cover door is completely closed, to allow independent rotation of the drive member in the predetermined direction. Thus, after the cover door is closed the drive member is free to be rotated by manual or motorized means to advance the filmstrip after each exposure is taken.

DETAILED DESCRIPTION OF THE PREFERRED EMBODIMENT

The invention is disclosed as being embodied preferably in a 35 mm still camera. Because the features of this type of camera are generally well known, the description which follows is directed in particular to elements forming part of or cooperating directly with the disclosed embodiment. It is to be understood, however, that other elements not specifically shown or described may take various forms known to persons of ordinary skill in the art.

THE FILM CASSETTE

Figure 1:
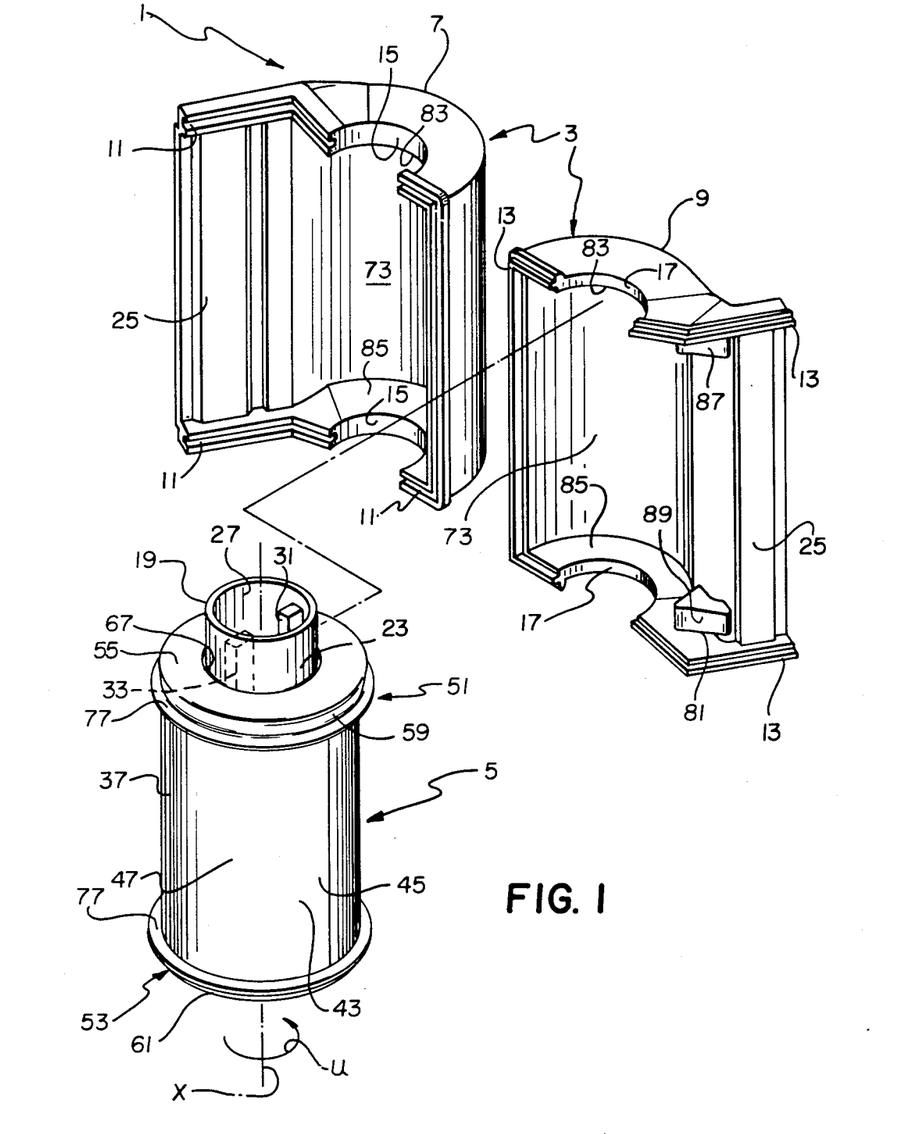
FIG. 1 is an exploded perspective view of a film cassette having a non-protruding film leader as disclosed in the cross-referenced application.
Figure 2:
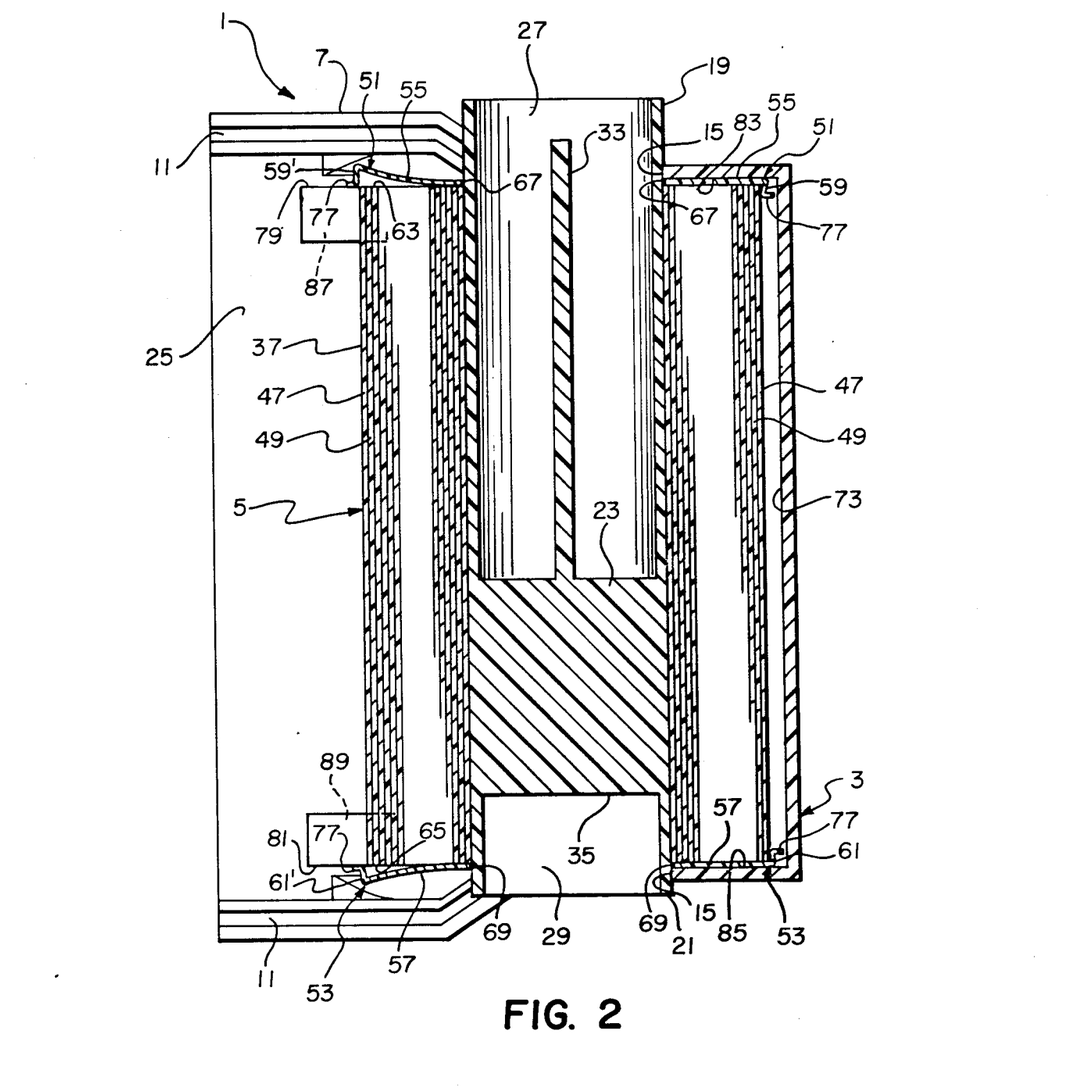
FIG. 2 is an elevation view in cross-section of the film cassette.
Figure 3:
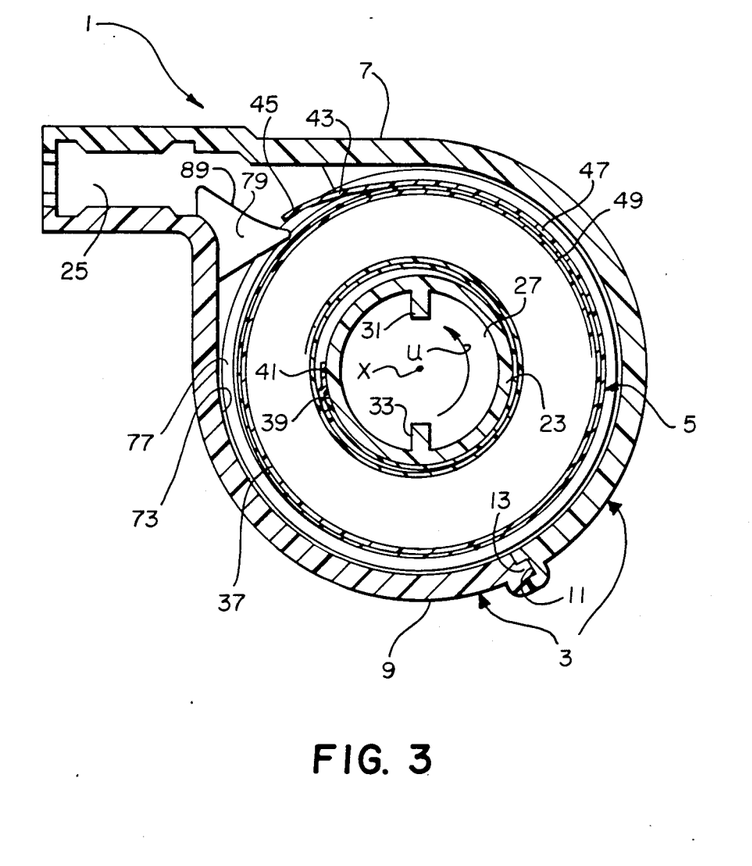
FIG. 3 is an end view in cross-section of the film cassette.

Referring now to the drawings, FIGS. 1–3 depict a 35 mm film cassette 1 generally as disclosed in the cross-referenced application. Specifically, the film cassette 1 comprises a light-tight cassette shell 3 and a film spool 5 which is rotatable about an axis X within the cassette shell. The cassette shell 3 consists of two shell halves 7 and 9 which are mated along respective grooved and stepped edge portions 11 and 13. The mated halves 7 and 9 define upper and lower aligned openings 15 and 17 for relatively longer and shorter opposite end extensions 19 and 21 of a spool core or hub 23. Also, they define a light-trapped film passage slit or mouth 25. The light-trapping means for preventing ambient light from entering the film passage slit 25, although not shown, may be a known velvet or plush material which lines the interior of the slit.

The spool core 23 as shown in FIGS. 1–3 includes relatively longer and shorter coaxial holes 27 and 29 opening at the respective longer and shorter opposite end extensions 19 and 21 of the spool core. A pair of spaced keying ribs 31 and 33 integrally formed with the spool core 23 are located within the longer coaxial hole 27, and a single keying rib 35 similarly formed with the spool core is located within the shorter coaxial hole 29. The several keying ribs 31, 33, and 35 according to custom may be engaged to rotate the film spool in an unwinding direction indicated by the arrow U in FIG. 1, or to rotate the spool in a winding direction opposite to the unwinding direction.

A roll 37 of convoluted 35 mm film having a uniform width is wound about the spool core 23. As indicated in FIG. 3, the film roll 37 has an inner or trailing end 39 attached to the spool core 23 by a suitable piece of adhesive tape 41 and a film leader 43. The film leader 43 has a leading or forward end 45 and comprises 2–3 convolutions of the film roll 37. One of these leader convolutions is the outermost convolution 47 and another of them is the next inward succeeding convolution 49.

Figure 4:
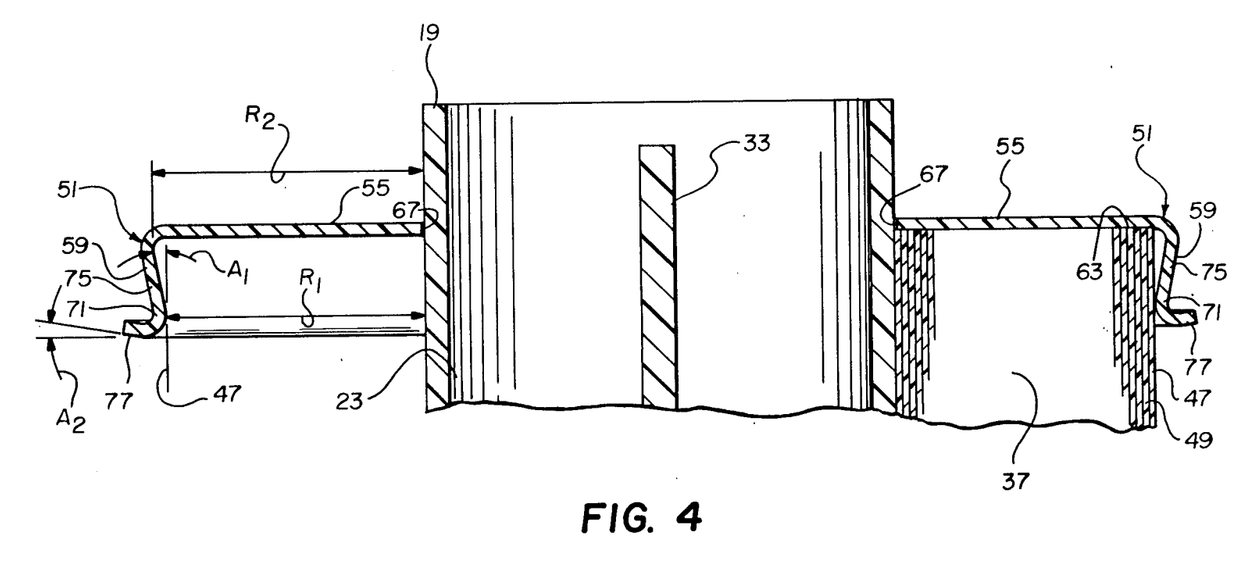
FIG. 4 is an elevation view in cross-section of one of a pair of flanges associated with a spool in the film cassette.

A pair of identical flanges 51 and 53 are coaxially spaced along the spool core 23 as shown in FIGS. 1 and 2. The two flanges 51 and 53 comprise respective integral disks 55 and 57 and respective integral annular lips or skirts 59 and 61 which circumferentially extend from the disks. The two disks 55 and 57 cover opposite sides, i.e. ends, 63 and 65 of the film roll 37 and they have respective central holes 67 and 69 through which the spool core 23 longitudinally extends to permit rotation of the spool core relative to the flanges 51 and 53. Each of the lips 59 and 61 as depicted in FIG. 4 includes the following:

(1) an annular constraining section 71 positioned relatively remote from one of the disks 55 and 57 a predetermined radial distance $R_1$ from the spool core 23 to enable each of the lips 59 and 61 to contact the outermost convolution 47 of the film roll 37, to radially confine the outermost convolution and thereby prevent the film roll from radially expanding or clock-springing against an inner wall 73 of the cassette shell 3;

(2) an annular relief section 75 extending from one of the disks 55 and 57 to the annular constraining section 71 of one of the lips 59 and 61 and positioned in a predetermined radial distance $R_2$ from the spool core 23, greater than the radial distance $R_1$, to enable each of the lips to avoid contacting the outermost convolution 47 substantially between one of the disks and the annular constraining section; and (3) an annular free end section 77 inclined radially outwardly from the annular constraining section 71 of one of the lips 59 and 61 and away from the outermost convolution 47. The annular relief section 75 of each of the lips 59 and 61 is inclined radially inwardly from one of the disks 55 and 57 toward the outermost convolution 47 to form an acute relief angle $A_1$ with the outer most convolution. See FIG. 4. The relief angle $A_1$ may be 11°45′, for example. The annular constraining section 71 of each of the lips 59 and 61 is curved radially inwardly with respect to the film roll 37 to enable both of the lips to contact the outermost convolution 47 in a substantially tangential manner (in the vertical sense in FIG. 4) and thereby limit the area of contact between the lips and the outermost convolution. The annular free end section 77 of each of the lips 59 and 61 is tilted slightly upwardly as shown in FIG. 4 to form an acute relief angle $A_2$. The relief angle $A_2$ may be 10°, for example. Thus, as shown in FIG. 2 the lips 59 and 61 are either shaped in the form of a "Z" or an "S".

A pair of rigid identical spreader surfaces 79 and 81 are fixed to the cassette half 9 at separate locations inwardly of the film passage slit 25 as shown in FIG. 2. The respective spreader surfaces 79 and 81 deflect opposite limited portions 59′ and 61′ of the annular lips 59 and 61 axially away from each other to an axial dimension slightly exceeding the film width. See FIG. 2. In essence, the deflected portions 59′ and 61′ of the annular lips 59 and 61 are axially spaced sufficiently to prevent those portions of the lips from radially confining corresponding portions of the outermost convolution 47 of the film roll 37. As indicated in FIG. 2, the remaining portions of the two lips 59 and 61 are maintained in place by inner semicircular flat surfaces 83 and 85 of the cassette shell 3. The flat surfaces 83 and 85 abut the respective disks 55 and 56, except in the vicinity of the spreader surfaces 79 and 81. Thus, the remaining portions of the two lips 59 and 61 continue to radially confine the outermost convolution 47.

As shown in FIG. 2, the annular free end section 77 of each of the annular lips 59 and 61, at the deflected portions 59′ and 61′ of the two lips, bears against the respective spreader surfaces 79 and 81. Since the annular free end section 77 of each of the lips has a gentle curve to it as best seen in FIG. 4, very little wear occurs between the free end section and either of the spreader surfaces 79 and 81. The relief angle $A_2$ of the annular free end section 77 of each of the lips is useful during assembly of the film cassette 1, to position either of the spreader surfaces 79 and 81 relative to an annular free end section.

When the spool core 23 is initially rotated in the unwinding direction U, the two flanges 51 and 53 may remain substantially stationary and the film roll 37, since its inner end 39 is attached to the spool core, tends to expand radially or clock-spring to ensure a non-slipping relation between the outermost convolution 47 of the film roll and the annular lips 59 and 61 of the flanges. Then, rotation of the spool core 23 in the same direction will similarly rotate the two flanges 51 and 53. As a result, the two spreader surfaces 79 and 81 will deflect successive portions 59′ and 61′ of the annular lips 59 and 61 axially away from each other as the respective portions are rotated past the spreader surfaces. The deflected portions 59′ and 61′ of the two lips 59 and 61 are returned to their original non-flexed condition by the semicircular flat surfaces 83 and 85 of the cassette shell 3. As can be appreciated from FIG. 3, the leading end 45 of the film roll 37 will be freed from the radial confinement of the two lips 59 and 61 in the vicinity of the two spreader surfaces 79 and 81, and it will be advanced against a pair of rigid identical stripper-guide surfaces 87 and 89 integrally formed with the respective spreader surfaces. The two stripper-guide surfaces 87 and 89 operate to direct the leading end 45 into the film passage slit 25, thereby allowing succeeding portions of the outermost convolution 47 to be freed from corresponding portions of the two lips 59 and 61 as those portions of the lips are deflected by the two spreader surfaces 79 and 81. Consequently, continued rotation of the spool core 23 will thrust the film leader 43 from the inside to the outside of the cassette shell 3.

THE PHOTOGRAPHIC CAMERA

Figure 5:
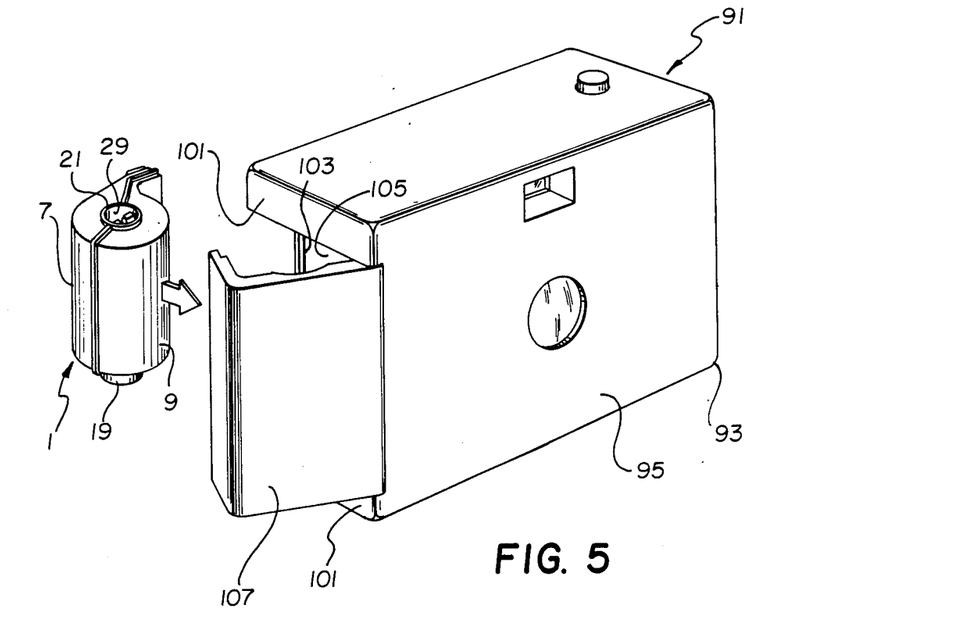
FIG. 5 is a front perspective view of an improved camera according to a preferred embodiment of the invention, showing a cover door of the camera open to permit loading of the film cassette into the camera.
Figure 6:
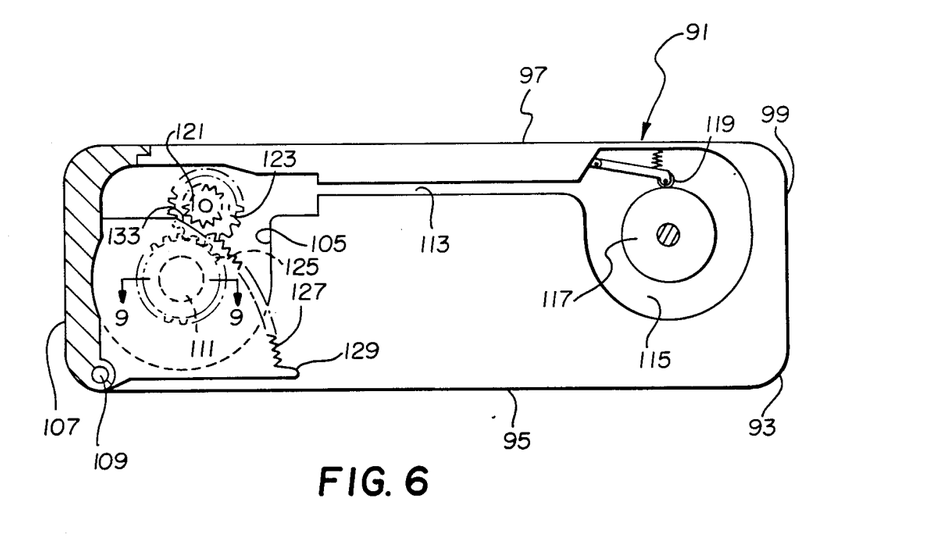
FIG. 6 is a bottom plan view of the camera interior, showing the cover door closed and the camera not loaded with the film cassette.

Referring now to FIGS. 5-10, an improved 35 mm still camera 91 is depicted for use with the film cassette 1. The camera body 93 as shown in FIGS. 5 and 6 has a pair of relatively large front and rear faces 95 and 97 and a pair of opposite ends 99 and 101 located between the two faces. The opposite end 101, which is the leftward one in FIGS. 5 and 7, has a rectangular-shaped opening 103 leading to a cassette-receiving chamber 105 located within the camera body 93. A cover door 107 is supported by means of a pin 109 for pivotal opening and closing movements to uncover and recover the chamber 105 at the opening 103.

Figure 8:
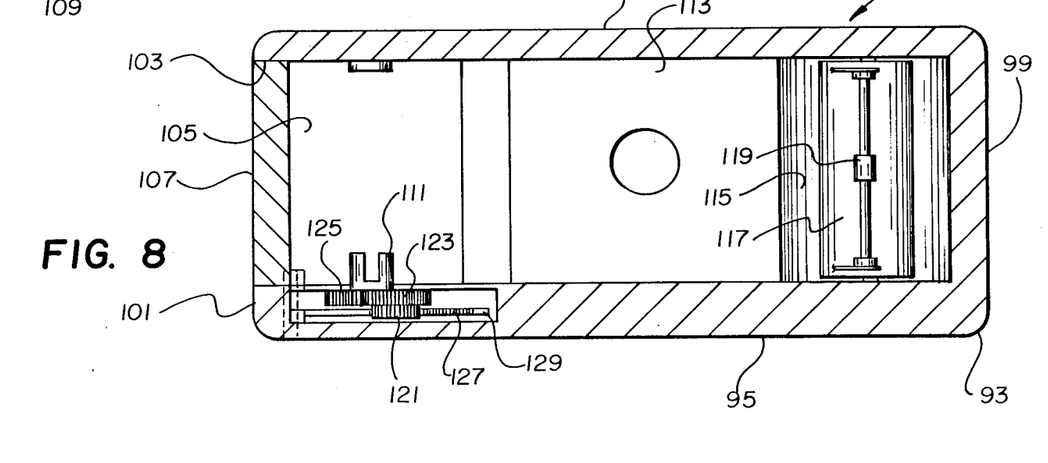
FIG. 8 is a rear elevation view of the camera interior.
Figure 9:
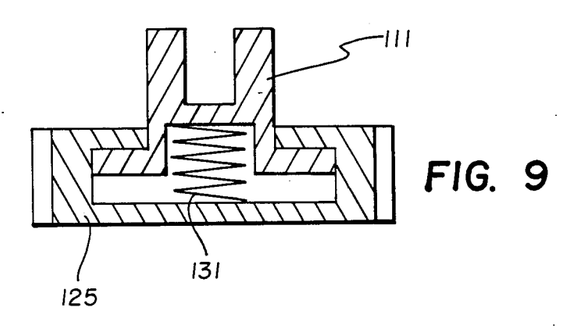
FIG. 9 is a cross-sectional view of a drive member for the film cassette as seen in the direction of the arrows 9, 9 in FIG. 6.

As shown in FIGS. 6, 8, and 9, a drive member, preferably a rotation shaft 111, projects from the bottom of the cassette-receiving chamber 105 in order to engage the two keying ribs 31 and 33 integrally formed with the spool core 23 of the film cassette 1, when the cassette is loaded in the chamber. The rotation shaft 111 serves to rotate the spool core 23 in the unwinding direction U to thrust the non-protruding film leader 43 from the film cassette 1 as described in detail above. A film guide channel 113 is arranged between the cassette-receiving chamber 105 and a film take-up chamber 115 to allow rotation of the spool core 23 to advance the film leader 43 from the film cassette 1 to a typical rotatable take-up drum 117 located within the take-up chamber. A conventional spring-urged presser roller 119 serves to facilitate attachment of the film leader 43 to the take-up drum 117.

Motion responsive means responsive to closing movement of the cover door 107, for rotating the shaft 111 to rotate the spool core 23 in the unwinding direction U, comprises a toothed pinion 121 coaxially fixed to a first transmission gear 123, a second transmission gear 125 coaxially fixed to the shaft 111, and a toothed rack or sector gear 127 connected to the cover door 107. The two transmission gears 123 and 125 are disposed in continuous engagement.

Figure 7:
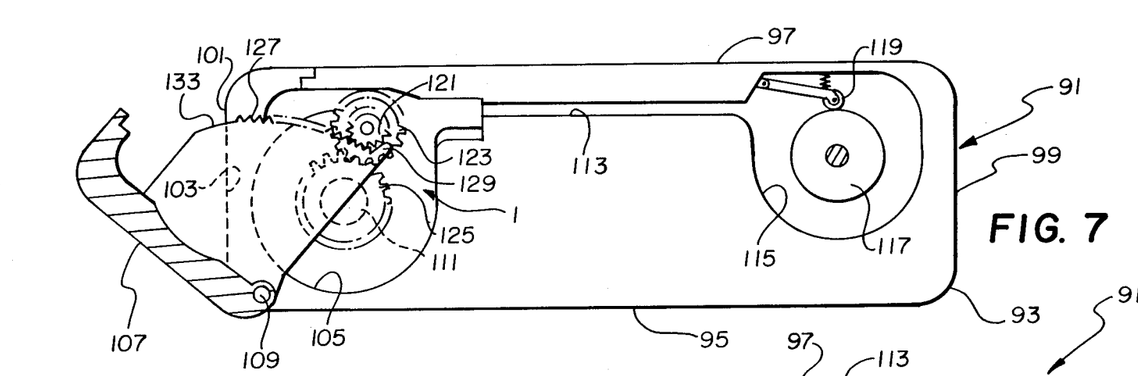
FIG. 7 is a view similar to FIG. 6, showing the cover door opened and the film cassette loaded in the camera.
Figure 10:
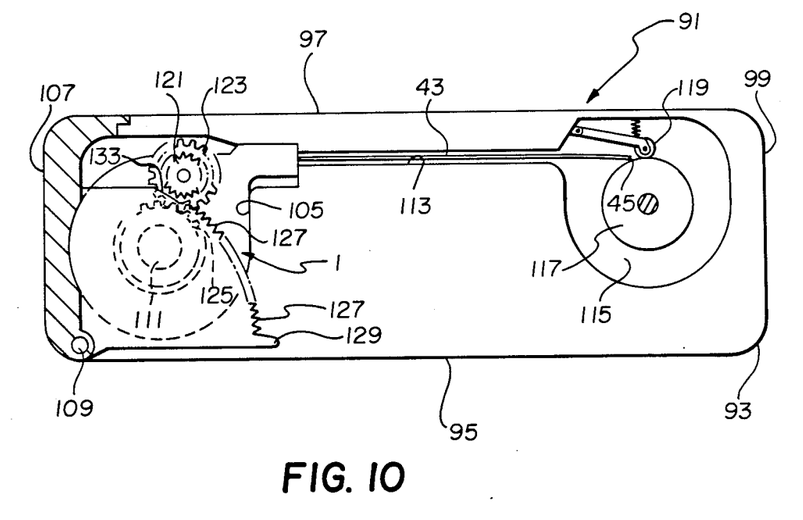
FIG. 10 is a view similar to FIG. 6, showing the cover door closed and the film cassette loaded in the camera.

When the cover door 107 is opened as shown in FIG. 7, a stop member 129 on the rack 127 is moved into abutment against the pinion 121 to limit the extent to which the door can open. To properly load the film cassette 1 in the cassette-receiving chamber 105, one simply places the extension 19 of the spool core 23 on the shaft 111. As shown in FIG. 9, the shaft 111 can be moved axially by a compression spring 131 in a known manner to ensure that the shaft engages the two keying ribs 31 and 33 of the spool core 23. During closing movement of the cover door 107, the rack 127 is advanced in continuous engagement with the pinion 121 to jointly rotate the pinion and the first transmission gear 123. This, in turn, jointly rotates the second transmission gear 125 and the shaft 111 to thereby rotate the spool core 23 in the unwinding direction U to thrust the film leader 43 from the film cassette 1 to the take-up drum 117. When the cover door 107 is completely closed as shown in FIG. 10, a non-toothed section 133 of the rack 127 is positioned opposite the pinion 121 to disengage the rack from the pinion. This permits a conventional drive mechanism, not shown, to then rotate the spool core 23 in the unwinding direction, after a drive gear of the mechanism is swung into engagement with either one of the two transmission gears 123 and 125. Alternatively, a suitable slip clutch may be employed.

THE ALTERNATE EMBODIMENT

Figure 11:
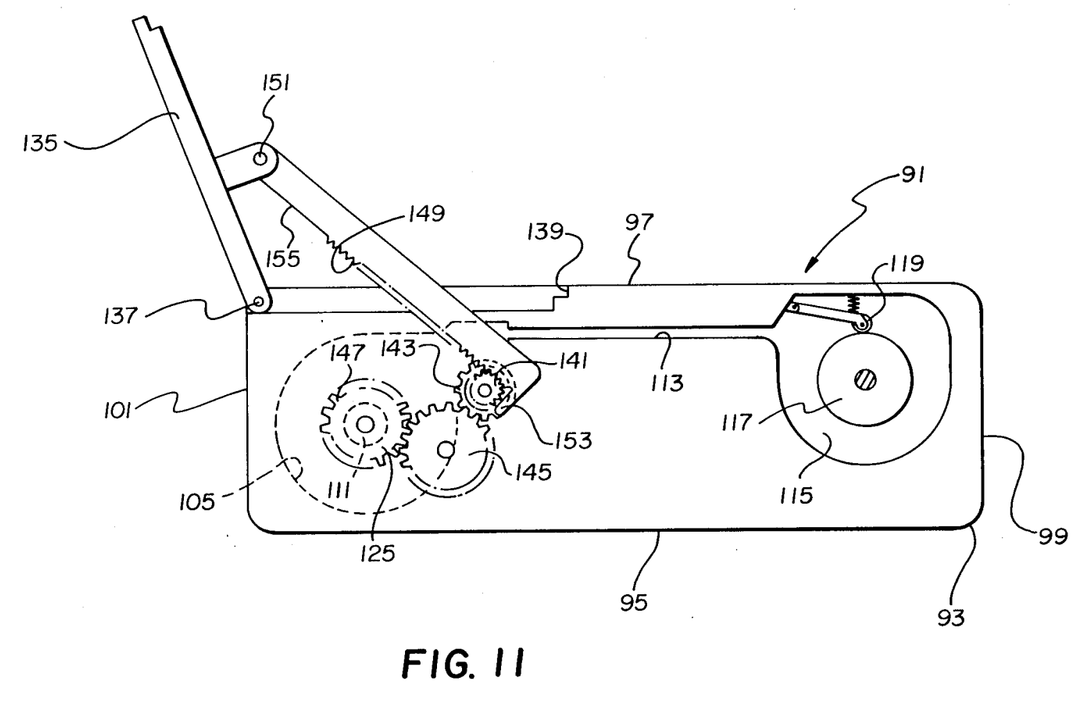
FIG. 11 is a bottom plan view of an alternate embodiment of the camera, showing the cover door opened and the camera not loaded with the film cassette.
Figure 12:
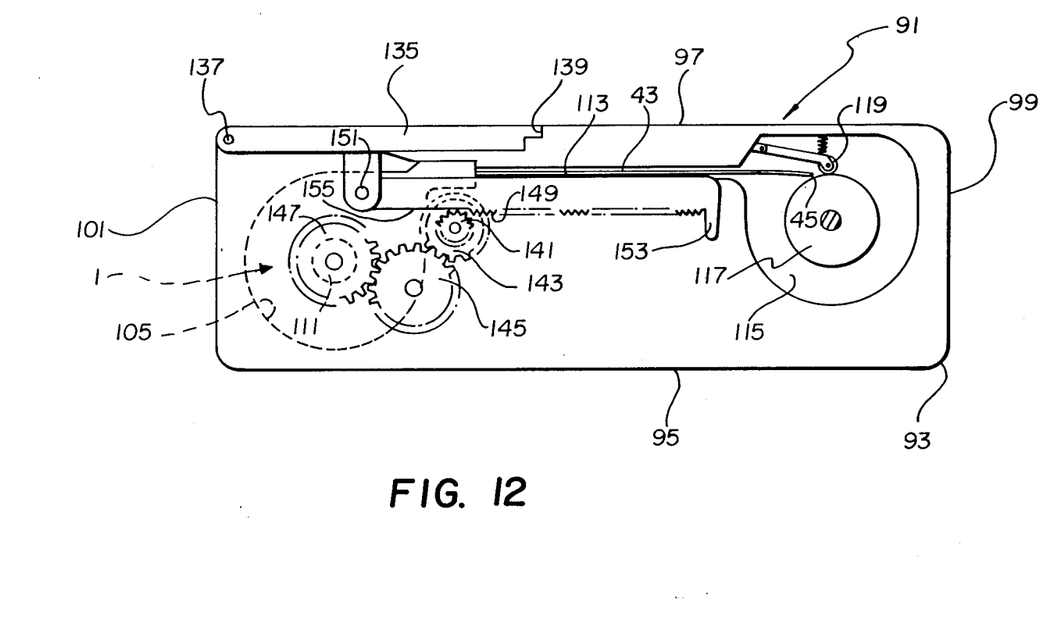
FIG. 12 is a view similar to FIG. 11, showing the cover door closed and the film cassette loaded in the camera.

Referring now to FIGS. 11 and 12, an alternate embodiment of the 35 mm still camera 91 is depicted for use with the film cassette 1. The reference numbers appearing in FIGS. 11 and 12 are the same as in FIGS. 5-10 for similar components and are different for alternate components.

In place of the cover door 107, a cover door 135 is supported by means of a pin 137 for opening and closing movements to uncover and recover a rectangular-shaped opening 139 in the rear face 97 of the camera body 93. The opening 139 leads to the cassette-receiving chamber 105.

Motion responsive means responsive to closing movement of the cover door 135, for rotating the shaft 111 to rotate the spool core 23 in the unwinding direction U, comprises a toothed pinion 141 coaxially fixed to a first transmission gear 143, an intermediate gear 145, a second transmission gear 147 coaxially fixed to the shaft 111, and a toothed rack 149 pivotally connected to the cover door by means of a pin 151. The intermediate gear 145 is disposed in continuous engagement with the two transmission gears 143 and 147.

When the cover door 135 is opened as shown in FIG. 11, a stop member 153 on the rack 149 is moved into abutment against the pinion 141 to limit the extent to which the door can open. To properly load the film cassette 1 in the cassette-receiving chamber 105, one simply places the extension 19 of the spool core 23 on the shaft 111. During closing movement of the cover door 135, the rack 149 is swung in continuous engagement with the pinion 141 to jointly rotate the pinion and the first transmission gear 143. This, in turn, immediately rotates the intermediate gear 145 to jointly rotate the second transmission gear 147 and the shaft 111 to thereby rotate the spool core 23 in the unwinding direction U to thrust the film leader 43 from the film cassette 1 to the take-up drum 117. When the cover door 135 is completely closed as shown in FIG. 12, a non-toothed section 155 of the rack 149 is positioned opposite the pinion 141 to disengage the rack from the pinion.

The invention has been described with reference to a preferred embodiment. However, it will be appreciated that variations and modifications can be effected within the ordinary skill in the art without departing from the scope of the invention. For example, the leading end 45 of the film leader 43, instead of initially being located as shown in FIG. 3, could be located in the film passage slit 25 of the film cassette 1 or could slightly protrude from the cassette. Thus, the term "non-protruding" as it refers to the film leader 43 in this application is meant to include "essentially non-protruding".

According to another example, instead of purely mechanical means for rotating the shaft 111 in response to closing movement of the cover door 107 or 135, there could be provided electromechanical means including a drive motor energized due to closure of a door-sensing switch. That is, closing movement of the cover door would close the switch to, in turn, energize the drive motor to rotate the shaft 111.

I claim:

1. An improved photographic camera wherein a cover door is supported for opening and closing movements to uncover and recover a film cassette-receiving chamber, and wherein the improvement comprises:
   said chamber being configured to receive a film cassette having a film spool engageable for rotation in an unwinding direction to propel a film leader from inside the cassette to outside the cassette;
   a drive member rotatable in engagement with the film spool in a predetermined direction to rotate the film spool in the unwinding direction; and
   motion responsive means responsive to closing movement of said cover door for rotating said drive member in the predetermined direction, whereby the film leader will automatically be propelled from the film cassette.

2. The improvement as recited in claim 1, wherein said drive member is supported to engage the film spool in a coaxial relation to enable the two to rotate in the same direction in order to rotate the film spool in the unwinding direction.

3. The improvement as recited in claims 1 or 2, wherein said motion responsive means includes releasable coupling means for connecting said cover door and said drive member substantially during closing movement of the cover door, to rotate the drive member in the predetermined direction, and for disconnecting said cover door and said drive member whenever the cover door is completely closed, to allow independent rotation of the drive member in the predetermined direction.

4. The improvement as recited in claim 3, wherein said releasable coupling means includes stop means for limiting opening movement of said cover door.

5. The improvement as recited in claim 3, wherein said releasable coupling means includes a toothed pinion rotatable to rotate said drive member and a toothed rack connected to said cover door to advance in engagement with said pinion substantially during closing movement of the cover door, to rotate the pinion, and wherein said rack has a non-toothed section arranged to be positioned opposite said pinion whenever said cover door is completely closed, to disengage from the pinion.

6. The improvement as recited in claim 5, wherein said film cassette-receiving chamber is open at one end of said camera to receive the film cassette, and said cover door is supported for opening and closing movements to uncover and recover said opening.

7. The improvement as recited in claim 5, wherein said film cassette-receiving chamber is open at a rear portion of said camera to receive the film cassette, and said cover door is supported for opening and closing movements to uncover and recover said opening.

8. The improvement as recited in claim 5, wherein said rack includes a stop member engageable with said pinion to limit opening movement of said cover door.

9. An improved photographic camera wherein a cover door is supported for opening and closing movements to uncover and recover a film cassette-receiving chamber, and wherein the improvement comprises:
   said chamber being configured to receive a film cassette having a film spool engageable for rotation in an unwinding direction to propel a film leader from inside the cassette to outside the cassette;
   a drive member rotatable in engagement with the film spool in the unwinding direction to similarly rotate the film spool; and
   mechanical motion responsive means responsive to closing movement of said cover door for rotating said drive member sufficiently in the unwinding direction before the cover door is completely closed to propel the film leader from the film cassette.

* * * * *